July 4, 1939.     N. A. LAURY     2,165,170
PURIFICATION OF SULPHUR
Filed May 6, 1938
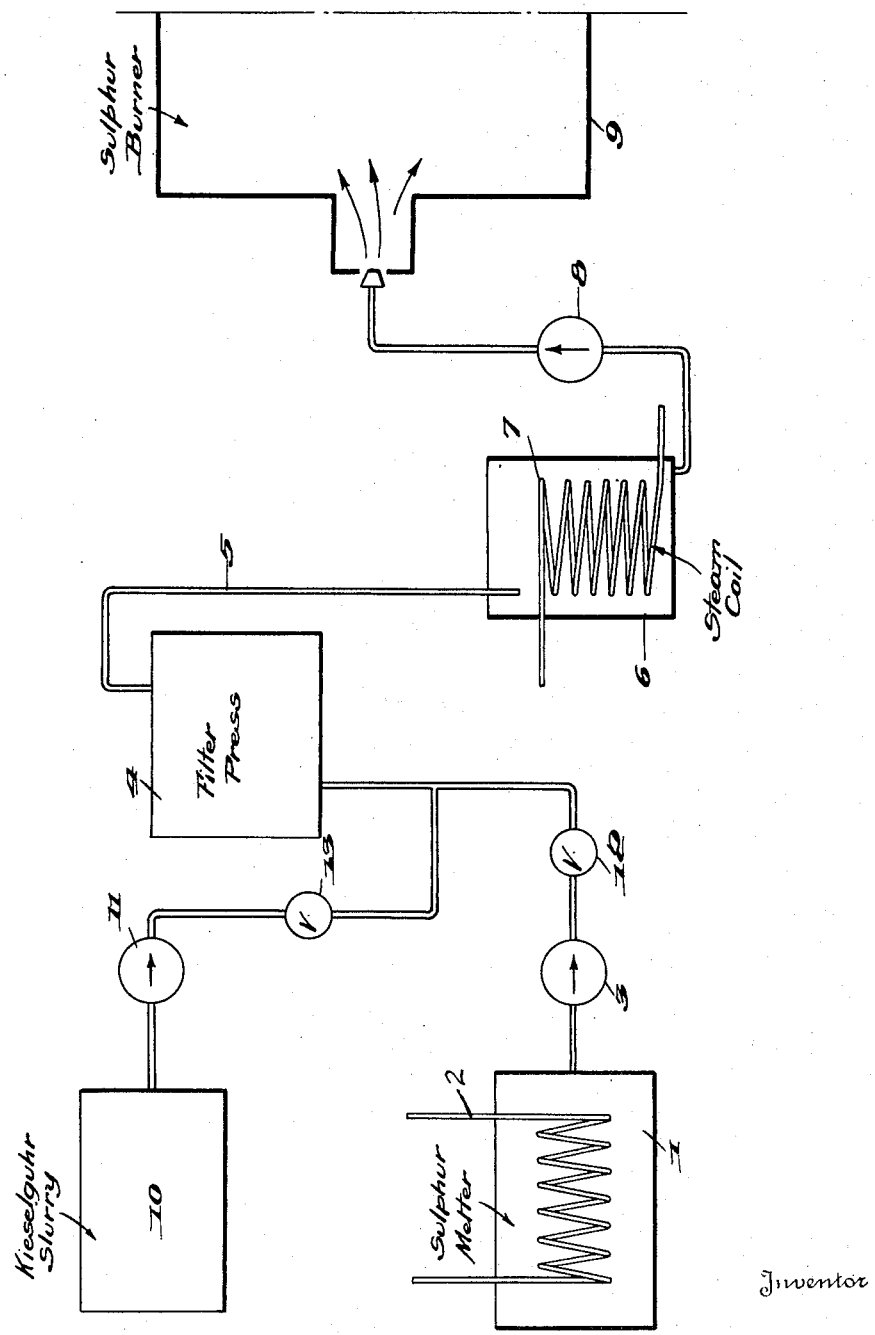
Inventor
Napoleon. A. Laury,
By Robert Ames Norton
Attorney Patented July 4, 1939

2,165,170

UNITED STATES PATENT OFFICE 2,165,170

PURIFICATION OF SULPHUR

Napoleon Arthur Laury, Rockville Centre, N. Y., assignor to The Calco Chemical Company, Inc., Bound Brook, N. J., a corporation of Delaware Application May 6, 1938, Serial No. 206,451

2 Claims. (Cl. 23—179)

This application is a continuation-in-part of application, Serial No. 128,161 filed February 27, 1937.

This invention relates to the purification of sulphur for use in producing sulphuric acid.

When sulphur is mined in the usual manner by melting and pumping to the surface, some of the sulphur is of a bright yellow color and other portions are distinctly black or dark. The colored impurities in the dark sulphur are largely hydrocarbons. The dark sulphur commands a materially lower price than does the light sulphur and the impurities present render the sulphur less suitable for use in making sulphuric acid because of the fact that the carbonaceous impurities are tarry or oily and therefore are fluid at the temperature of molten sulphur.

Various elaborate methods have been proposed for the removal of these fluid impurities as well as the small amount of inorganic impurities also present. Among the processes proposed are those using silica gel and other adsorbents, alundum filters and the like. These prior processes have depended, of course, for their action on the adsorption of liquid into the fine pores and capillaries of the decolorizing agent used. While these processes do produce high-grade sulphur with a removal of 60% or more of the carbonaceous impurities, the processes are very expensive because the adsorbents have to be regenerated and both the refractory filter aids, such as silica gel, and the filters, such as alundum, are relatively high in price.

According to the present invention, the surprising discovery has been made that ordinary filter cloth which is free from capillaries and normally has no adsorption power, will remove the liquid carbonaceous impurities as well as inorganic impurities with substantially the same efficiency as the microporous adsorbents which were considered necessary in the prior art. I do not know what the reason is for this extraordinary behavoir of the refractory filter cloth which is known to be composed of non-absorbent wires for when a petroleum oil of a composition similar to the carbonaceous impurities is filtered, the oil runs through in the ordinary way. It may be that in the filtering step there is some combination of oil and sulphur formed which is retained by the filter cloth. In any event, a cake builds up just as if insoluble solid impurities were being filtered out. I do not wish to limit my invention to any theory of action of the filter cloth. It does not appear to be one which is specific to filter cloths made of certain materials; on the contrary, an important advantage of the present invention is that any suitable fine refractory filter cloth can be used, the only requisite being that it is not corroded by the sulphur to an excessive degree. Such standard filter cloth materials as Monel metal, brass, and aluminum wire operate with excellent efficiency, showing no noticeable corrosion after months of use. Copper, phosphor bronze and steel wire cloths also are useful, although they are less satisfactory as they are attacked by sulphur and therefore have a relatively short life. The fact that the present invention does not depend on the use of any particular material in filter cloths is an important advantage as it renders the invention generally usable. Because of the lack of effect of the different materials on the process, I believe that no catalytic action is present; but inasmuch as this cannot be definitely proven, I do not wish to limit this invention to this theory.

While bare filters operate satisfactorily, as soon as a film of impurities has deposited on the wire, some impurities pass through when the filter is first started in operation. In most cases, this is not a serious matter, but if it is desired to effect the highest degree of purification throughout the whole operation, it is advantageous to build up a very thin coating of solids on the wires before filtration of the sulphur starts. This may be effected, for example, by pumping a small amount of a slurry of diatomaceous earth through the filter before the sulphur filtration starts. This procedure should not be confused with the decolorizing absorbents used in the prior art as the amount of solids on the wires is very small in comparison to the amount of impurities which build up as a cake, and is entirely insufficient to absorb more than a minute fraction of the liquid impurities which are taken out by the process.

While the present invention is usable with any of the standard types of filters such as plate presses, Kelly presses, centrifuges, and the like, I find that the best results and maximum simplicity of operation is in a Kelly press filter. The invention is, however, not limited to filters of this type alone, having the advantage of being generally applicable to the common types.

The present invention will be described in conjunction with a drawing which is a diagrammatic flow sheet, partly in section, of a typical embodiment of the present invention.

Dark sulphur is charged into a sulphur melting tank 1 which is heated by suitable steam coils 2. A slurry of kieselguhr and water, or paper and water, is charged into tank 10 and when the operations are started, a small amount of the slurry is pumped by the pump 11 through the filter press 4 to coat the wires. Valve 13 is then closed, valve 12 is opened, and the molten sulphur is pumped by the pump 3 through the filter press. The temperature of the sulphur is maintained at about 130° to 150° C., and the original crude material contains some 0.25% of hydrocarbon oil and about 0.03% of inorganic materials. The filter press is illustrated diagrammatically as a steam-jacketed Kelly press provided with Monel metal filtering cloths of about 80 mesh, the area of filter cloth being about 10 square feet for an installation to purify sulphur for a 100 ton per day contact sulphuric acid plant. The rate of filtration is maintained at 5 pounds per minute per square foot of filter cloth and a pressure of 20 to 50 pounds is likewise maintained. The filtered sulphur which is bright in color and has approximately 0.1% of carbonaceous material and 0.0006% of inorganic materials flows out of the press through the line 5 into a tank 6 provided with steam coil 7 where it is maintained molten. From this tank, the sulphur is pumped by the pump 8 into a sulphur burner 9. No difficulty is encountered in the sulphur burner and allied equipment, and the usual dust filter may be eliminated if desired. The cloths of the filter press have to be cleaned at intervals to remove the cake which forms on them, the cleaning being effected in the usual manner.

While the invention has been described more particularly in conjunction with the purification of dark sulphur where it finds its greatest utility, it should be understood that it is also applicable to bright sulphur which likewise contains impurities though in smaller amounts. Because of its extreme cheapness, the present invention can be applied to bright sulphur without materially increasing its cost. The improvement of quality in the sulphur is not so marked as when dark sulphur is treated but the advantages of the invention are enjoyed to the extent of the presence of impurities in the bright sulphur.

What I claim is:

1. A method of burning sulphur which comprises melting crude sulphur containing liquid carbonaceous impurities, filtering the molten sulphur containing the liquid carbonaceous impurities through a refractory filter cloth in the absence of any substantial quantities of decolorizing adsorbents to remove liquid carbonaceous impurities therefrom, maintaining the filtered sulphur in molten state, introducing the molten, filtered sulphur into a sulphur burner and burning it therein.

2. A method according to claim 1 in which the refractory filter cloth is pre-coated with a thin film of solid material insufficient in amount to effect the adsorption of any appreciable amount of carbonaceous impurities.

NAPOLEON ARTHUR LAURY.